United States Patent
Naruse (10) Patent No.: US 9,626,230 B2
(45) Date of Patent: Apr. 18, 2017

(54) PROCESSOR AND CONTROL METHOD OF PROCESSOR

(71) Applicant: FUJITSU LIMITED, Kawasaki-shi, Kanagawa (JP)

(72) Inventor: Akira Naruse, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 130 days.

(21) Appl. No.: 14/475,089

(22) Filed: Sep. 2, 2014

(65) Prior Publication Data

US 2015/0074682 A1    Mar. 12, 2015

(30) Foreign Application Priority Data

Sep. 11, 2013    (JP) ................. 2013-188579

(51) Int. Cl.
G06F 9/46    (2006.01)
G06F 9/52    (2006.01)

(52) U.S. Cl.
CPC .................. G06F 9/522 (2013.01)

(58) Field of Classification Search
None
See application file for complete search history.

(56) References Cited

U.S. PATENT DOCUMENTS 7,945,911 B1 * 5/2011 Garthwaite ........... G06F 9/4843
                                                          707/814
8,555,291 B2   10/2013 Nishihara
2004/0064675 A1 * 4/2004 Jahnke ................ G06F 13/1663
                                                          712/1
2005/0198475 A1 * 9/2005 Arnold .................. G06F 9/4881
                                                          712/228
2009/0293072 A1 * 11/2009 Elshocht ............... G06F 1/3228
                                                          719/327
2011/0099393 A1 * 4/2011 Tran .................... G06F 9/30181
                                                          713/300
2012/0284729 A1 * 11/2012 Sharda .................. G06F 9/5094
                                                          718/104

FOREIGN PATENT DOCUMENTS

JP    2003-108392 A    4/2003
WO    2009090964 A1    7/2009

* cited by examiner

*Primary Examiner* — Timothy A Mudrick
*Assistant Examiner* — Timothy Duncan
(74) *Attorney, Agent, or Firm* — Fujitsu Patent Center (57) ABSTRACT

A core executing processes in plural threads specifies one gate to read out a state of the gate from a thread progress control unit holding information of plural gates disposed in a loop state, setting a state of a gate disposed subsequently relative to a gate when a state of the gate is set to a first state to a second state, and setting the state of the gate to the first state when a certain period of time elapses from a first request of reading the state for the gate which is set to the second state, by every certain process in each thread. The core executes a next process when the state of the specified gate is the first state, and makes the execution of the next process wait until the state becomes the first state when it is not the first state.

9 Claims, 7 Drawing Sheets

PROCESSOR AND CONTROL METHOD OF PROCESSOR

CROSS-REFERENCE TO RELATED APPLICATION

This application is based upon and claims the benefit of priority of the prior Japanese Patent Application No. 2013-188579, filed on Sep. 11, 2013, the entire contents of which are incorporated herein by reference.

FIELD

The embodiments discussed herein are directed to a processor and a control method of a processor.

BACKGROUND

In recent years, a method improving performance of a processor by increasing the number of cores of the processor has been generalized, and the number of cores held by one processor increases (multi-coring). An application of a technology such as a simultaneous multi-threading technology in which plural threads are simultaneously executable in one core (multi-threading) has been advanced. The multi-coring and the multi-threading are advanced, and thereby, the number of threads simultaneously executed on the processor tends to increase.

In the processor simultaneously executing multiple threads, program execution performance is lowered if a cache miss and a TLB (Translation Look-aside Buffer) miss occur frequently. For example, when the number of memory areas (pages) simultaneously accessed by execution of a program is the number of TLB entries or less, the TLB miss does not occur during the memory areas are accessed. However, when the number of memory areas (pages) simultaneously accessed exceeds the number of TLB entries, the TLB miss occurs frequently (TLB thrashing).

Figure 10A:
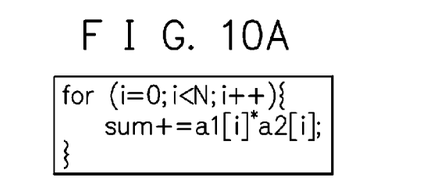
FIG. 10A is a view illustrating an example of a program executing a process in plural threads in parallel.
Figure 10B:
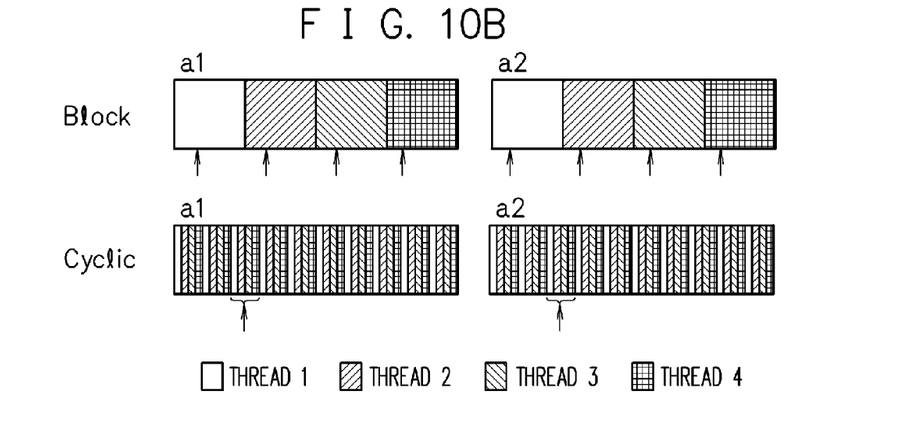
FIG. 10B is a view illustrating an example of a data assignment for threads.

In the processor simultaneously executing multiple threads, a cache memory and the TLB are shared by plural threads. Accordingly, when the plural threads are used in a data-parallel mode, there are possibilities in which the number of occurrence times of the cache miss and the TLB miss increases unless a proper data assignment for each thread is performed in consideration of configurations of the cache memory and the TLB. For example, when processes of a program illustrated in FIG. 10A are executed in four threads of a thread 1 to thread 4 in parallel, a part accessed by each thread within a certain period of time disperses in a block assignment and concentrates in a cyclic assignment as illustrated by arrows in FIG. 10B. Namely, the occurrence frequency of the cache miss and the TLB miss increases unless the data is assigned to the thread 1 to the thread 4 by the cyclic assignment.

The processor simultaneously executing multiple threads applies not an SIMD (Single Instruction Multiple Data) but an SPMD (Single Program Multiple Data) as an execution model. In the SIMD, it is necessary to frequently take synchronization between threads. In the SIMD, a synchronization cost becomes large as the number of threads becomes large, and as a result, the execution performance of the program is lowered. On the other hand, in the SPMD, it is not necessary to take synchronization between threads. Accordingly, in the SPMD, it is possible to reduce an idle time (a time when nothing is executed) of the core of the processor by executing the thread which is ready to execute regardless of a data sequence.

In the computer executing the plural threads in parallel, a technology is proposed in which progress of a current thread is controlled in accordance with a waiting time of the current thread until a reference thread reaches a synchronization point when the reference thread whose data is referred to by the current thread does not reach the synchronization point at the time when the current thread reaches the synchronization point, and a size of a quality difference when the current thread executes a process without referring to data at the synchronization point of the reference thread (for example, refer to Patent Document 1).

[Patent Document 1] International Publication Pamphlet No. WO2009/090964

[Patent Document 2] Japanese Laid-open Patent Publication No. 2003-108392

In the processor simultaneously executing multiple threads, the SPMD is applied as the execution model, and therefore, there is a possibility when there are a thread whose progress is fast and a thread whose progress is slow. When a progress difference between threads becomes large, a part of the memory accessed by each thread within a certain period of time disperses even if the data assignment of each thread is performed by a proper assignment such as the cyclic assignment, and there is a possibility in which the number of occurrence times of the cache miss and the TLB miss increases. When the number of occurrence times of the cache miss and the TLB miss increases, the execution performance of programs in the processor is lowered.

Figure 11:
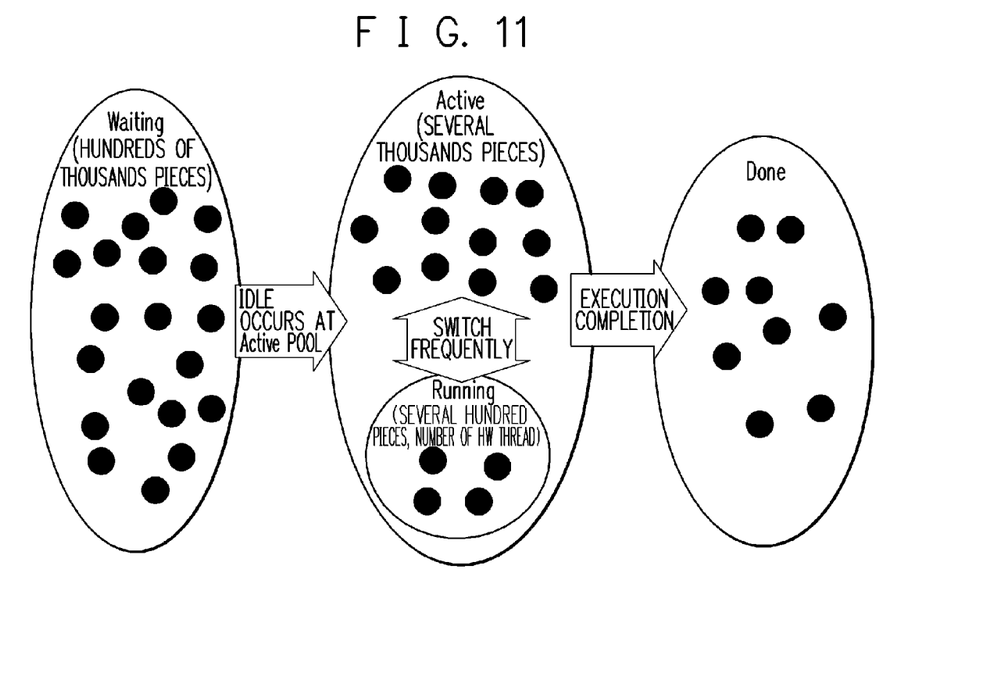
FIG. 11 is a view illustrating a state transition of a software thread.

The synchronization is taken among all threads so as not to enlarge the progress difference among threads, and thereby, it is possible to suppress the occurrences of the cache miss and the TLB miss caused by the progress difference among threads, but the synchronization cost becomes large if the synchronization is taken among all threads. In the processor simultaneously executing multiple threads, state transition occurs in a software thread as exemplified in FIG. 11. A thread in a waiting state transits to an active state when an idle occurs at an active pool. A thread in the active state is executed while frequently switching assignment to a hardware thread. The thread in the active state transits to a done state when the execution of the process completes. As stated above, in the processor simultaneously executing multiple threads, it is often the case when all threads are not simultaneously the active state, and there is a possibility in which the execution of the program stops, and therefore, it is impossible to take the synchronization among all threads.

SUMMARY

According to an aspect of the embodiments, a processor includes: a progress control unit which holds information of plural gates disposed in a loop state, sets a state of the gate disposed subsequently relative to the gate which is set to a first state to a second state when a state of the gate is set to the first state, and sets the state of the gate specified in a request to the first state when a certain period of time elapses from the first request of reading the state for the gate which is set to the second state; and an instruction execution unit which executes processes in plural threads, specifies one of the gates from among the plural gates to read out a state of the gate from the progress control unit by every certain process in each thread, executes a next process when the state of the specified gate is the first state, and makes the execution of the next process wait until the state of the specified gate becomes the first state when the state of the specified gate is not the first state.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, preferred embodiments will be explained based on accompanying drawings.

A processor according to a present embodiment controls progresses of threads such that a progress difference among plural threads in active states (execution states) is suppressed within an allowable range. The processor according to the present embodiment prepares plural (two or more) gates disposed in a loop state, and a state of the gate is read out by specifying the gate by every certain process in each of the plural threads which are in the active states. In each thread, the gate to be specified is switched by every certain process so that the gates are circulated in sequence.

In each thread, a next process is executed if a state of the specified gate is an opened state, and when the state of the specified gate is not the opened state, the execution of the next process is waited until the state of the specified gate becomes the opened state. After each gate transits to a closed state, the gate does not transit to the opened state until a certain period of time elapses from a time when an access to read the state is received first. The progresses of the processes in the threads are controlled by the gates as stated above, the thread whose progress is fast is appropriately delayed to suppress that the progress difference between the thread whose progress is fast and a thread whose progress is slow expands.

Each gate transits to the closed state when the state of the gate which is disposed previously becomes the opened state. In other words, when the state of the gate is set to the opened state, the state of the gate which is disposed subsequently relative to the gate in the opened state is set to the closed state. For example, when the number of gates is two (gate0 (zero) and gate1), the gate1 becomes the closed state when the gate0 becomes the opened state, and the gate0 becomes the closed state when the gate1 becomes the opened state. Besides, when the number of gates is three or more (gate0, gate1, gate2, gate3, . . . ), the gate1 becomes the closed state when the gate0 becomes the opened state, the gate2 becomes the closed state when the gate1 becomes the opened state, and the gate3 becomes the closed state when the gate2 becomes the opened state.

Figure 1:
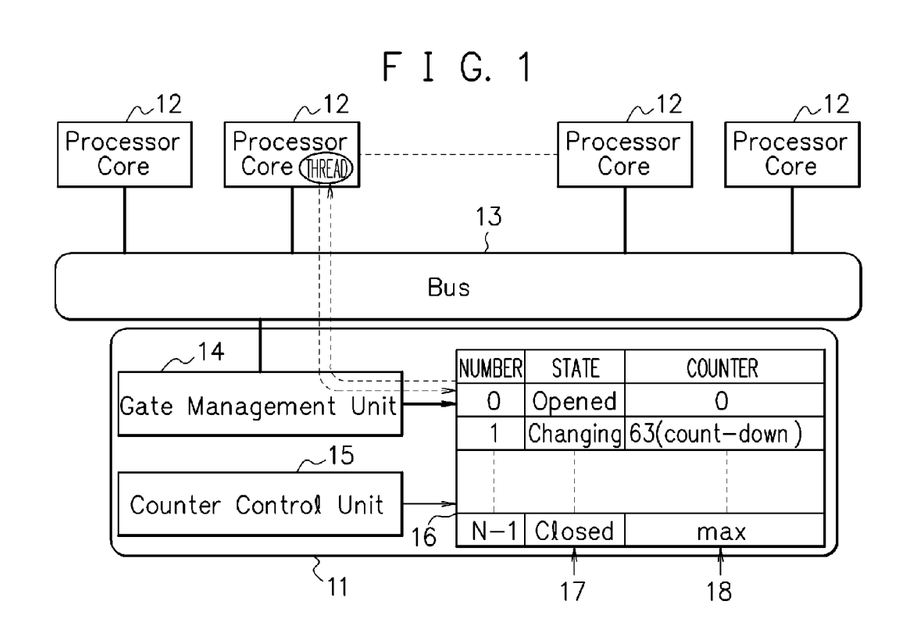
FIG. 1 is a view illustrating a configuration example of a thread progress control mechanism according to the present embodiment.

FIG. 1 is a view illustrating a configuration example of a thread progress control mechanism held by a processor according to the present embodiment. A thread progress control unit 11 is connected to plural cores 12 via a bus to be able to communicate. Each of the cores as an instruction execution unit held by the processor executes plural threads. A connection mode connecting between the thread progress control unit 11 and the cores 12 is not limited to the bus 13, but it may be anything, for example, it may be a crossbar and so on.

The thread progress control unit 11 includes a gate management unit 14, a counter control unit 15, and a gate state holding unit 16. The gate state holding unit 16 includes a table 17 holding states of respective gates, and counters 18 corresponding to the respective gates. In FIG. 1, an example preparing N-pieces of gates is illustrated, N is an integer of two or more.

The gate management unit 14 manages the table 17 holding the state of each gate. When the gate management unit 14 receives a read request of a gate state from a thread executing in the core 12, it acquires the state of the gate specified in the request from the table 17, and returns for the thread being a request source.

There are three states of the opened state, the closed state, and a changing state in the states of the gate. An initial state of each gate is the closed state. The example illustrated in FIG. 1 represents a state after the gate0 set to the opened state from the initial state. The opened state is a state in which a thread accesses to the gate is able to progress to a next process. When a certain gate is made transit to the opened state, the gate management unit 14 makes a gate next to the gate which is made transit to the opened state transit to the closed state. When the access for the gate which is made transit into the closed state is received from a thread, the gate management unit 14 makes the gate transit from the closed state to the changing state. When a value of the counter 18 corresponding to the gate in the changing state becomes a certain value ("0" (zero) in the example illustrated in FIG. 1), the gate management unit 14 makes the gate transit from the changing state to the opened state.

Figure 5A:
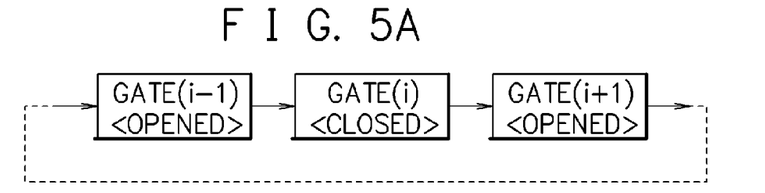
FIG. 5A, FIG. 5B, and FIG. 5C are views each illustrating an example of a state transition of gates according to the present embodiment.
Figure 5B:
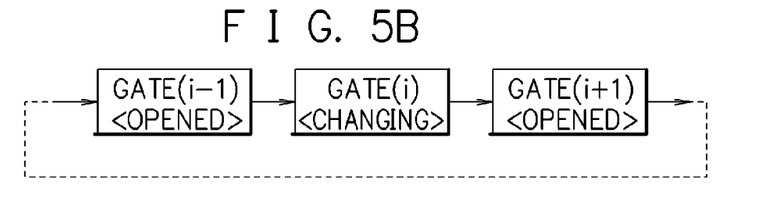
Figure 5C:
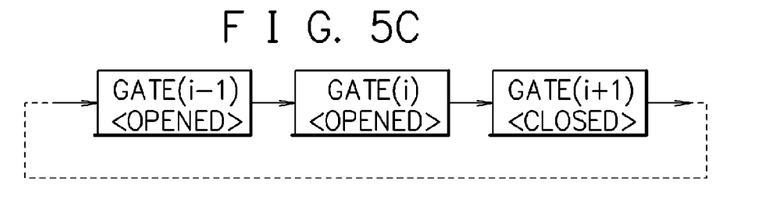

Namely, when a gate(i−1) is made transit to the opened state, the gate management unit 14 makes a next gate(i) transit to the closed state as illustrated in FIG. 5A. In this state, when an access for the gate(i) is received from a thread, the gate management unit 14 makes the gate(i) transit to the changing state as illustrated in FIG. 5B. When a value of a counter corresponding to the gate(i) becomes a certain value, the gate management unit 14 makes the gate(i) transit into the opened state, and makes a next gate(i+1) transit into the closed state as illustrated in FIG. 5C.

The counter control unit 15 controls the counter 18 corresponding to each gate. When the state of the gate transits from the closed state to the changing state, the counter control unit 15 sets a value of the counter 18 corresponding to the gate into an initial value ("max" in the example illustrated in FIG. 1) to start a count operation. In the present embodiment, the count operation of the counter 18 is a count-down decrementing one by one, but it may be a count-up incrementing one by one.

Figure 2A:
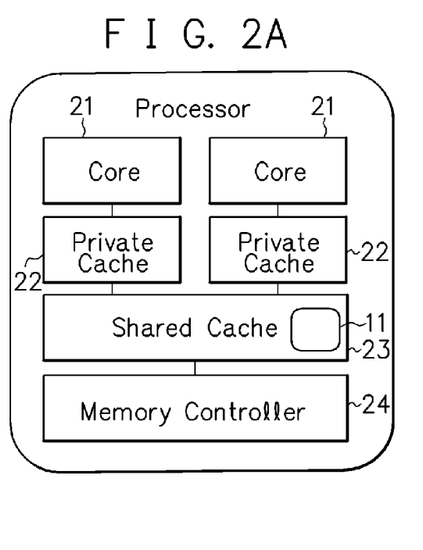
FIG. 2A and FIG. 2B are views each illustrating a configuration example of a processor according to the present embodiment.
Figure 2B:
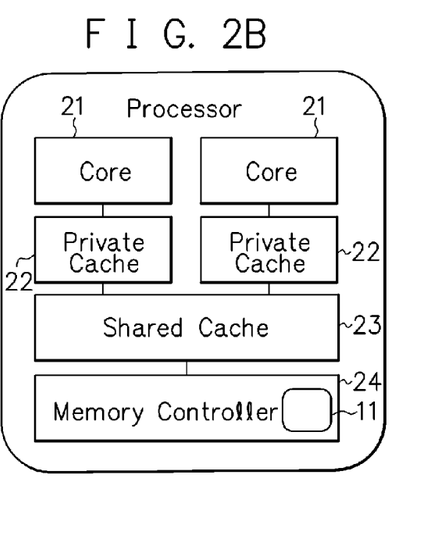

FIG. 2A and FIG. 2B are views each illustrating a configuration example of a processor according to the present embodiment. In FIG. 2A and FIG. 2B, reference numerals 21 are cores, and reference numerals 22 are private cache units provided to correspond to respective cores 21. A reference numeral 23 is a shared cache unit shared by all of the cores 21, and a reference numeral 24 is a memory controller capable of being accessed by all of the cores 21 to access to an external memory. The private cache unit 22 and the shared cache unit 23 each include a cache controller and a cache memory.

As illustrated in FIG. 2A and FIG. 2B, the thread progress control unit 11 is disposed to be accessible from all of the cores 21. FIG. 2A illustrates an example in which the thread progress control unit 11 is provided together with the shared cache unit 23. FIG. 2B illustrates an example in which the thread progress control unit 11 is provided together with the memory controller 24.

Figure 3:
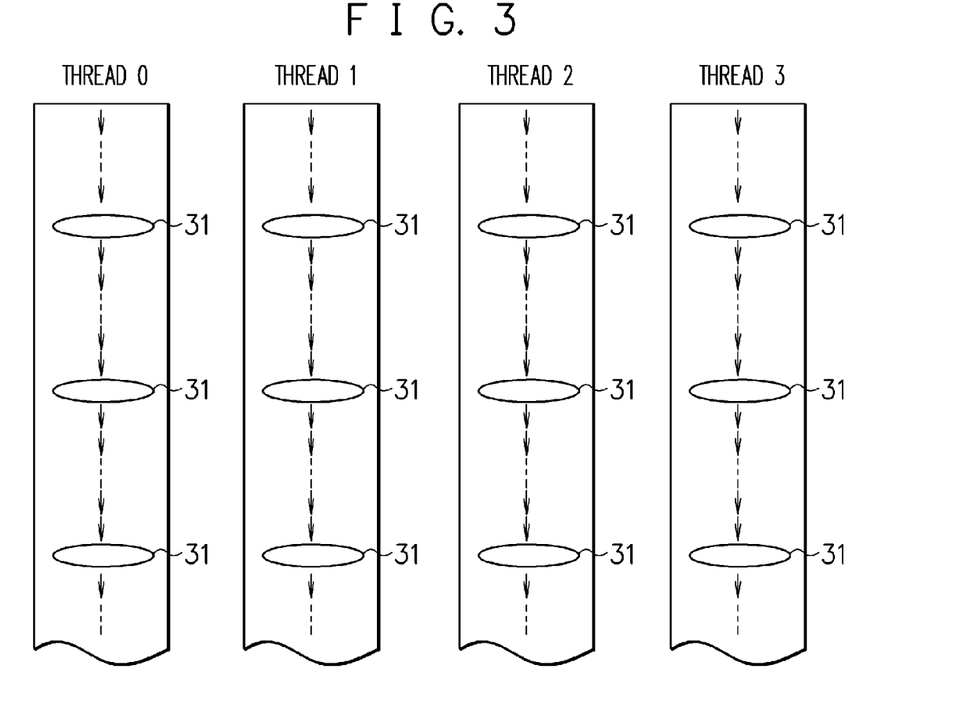
FIG. 3 is a view illustrating an example of a process of a thread according to the present embodiment.

In the present embodiment, as illustrated in FIG. 3, control points 31 are provided by every certain process in the process of each thread executed at the core of the processor. At the control point 31 of each thread, a gate is specified, and an access for the specified gate is performed to read out a state. As a result, the thread proceeds to a next process when the state of the specified gate is the opened state, and when the state of the specified gate is not the opened state, the access for the specified gate is repeated until the state becomes the opened state. Namely, a thread whose progress is fast proceeds to the next process after waiting for a relatively long time until the gate becomes the opened state, and a thread whose progress is slow proceeds to the next process after waiting for a short time or without waiting until the gate becomes the opened state. It is thereby possible to shorten a progress difference between the thread whose progress is fast and the thread whose progress is slow, and to suppress that the progress difference between the threads expands.

Figure 4A:
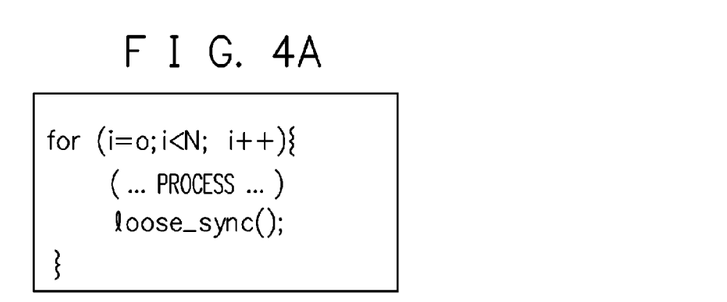
FIG. 4A is a view illustrating an example of a program including a progress control routine according to the present embodiment.
Figure 4B:
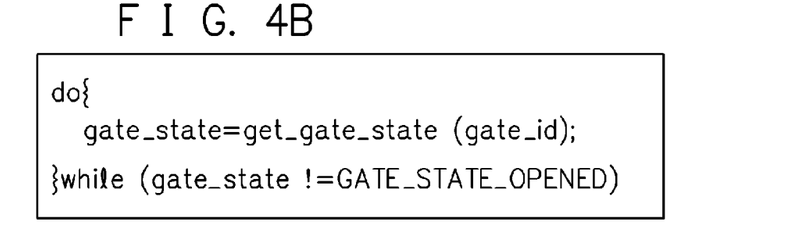
FIG. 4B is a view illustrating an example of the progress control routine according to the present embodiment.

The above-stated operation reading out the state by performing the access for the gate can be made enabled by, for example, disposing a progress control routine loose_sync( ) at a point where the progress difference between threads is to be shorten within a program executing processes in plural threads in parallel as an example illustrated in FIG. 4A. The progress control routine loose_sync( ) is a loop process in which the access for the gate specified by a gate id is repeatedly performed until the state of the gate becomes the opened state as an example illustrated in FIG. 4B. The disposition of the progress control routine loose_sync( ) may be performed by, for example, modifying software, automatically inserting by every certain process by a compiler. Besides, the access for the gate may be performed by accessing by using a dedicated instruction, or may be performed by accessing by a load instruction for an area where the gate is mapped into a memory space.

Figure 6A:
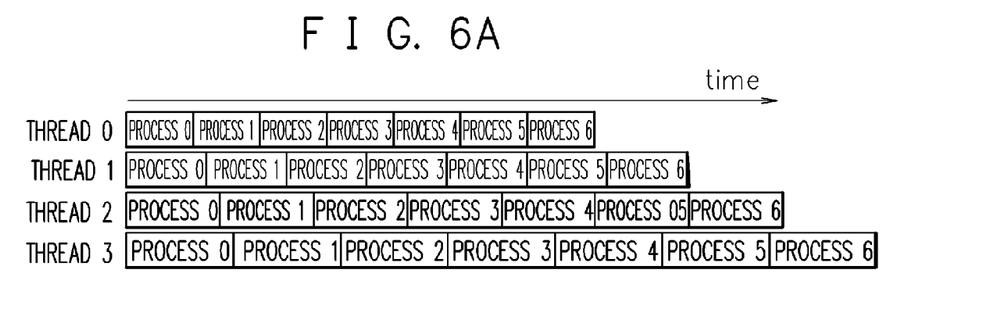
FIG. 6A is a view illustrating an operation when a process is simply executed.
Figure 6B:
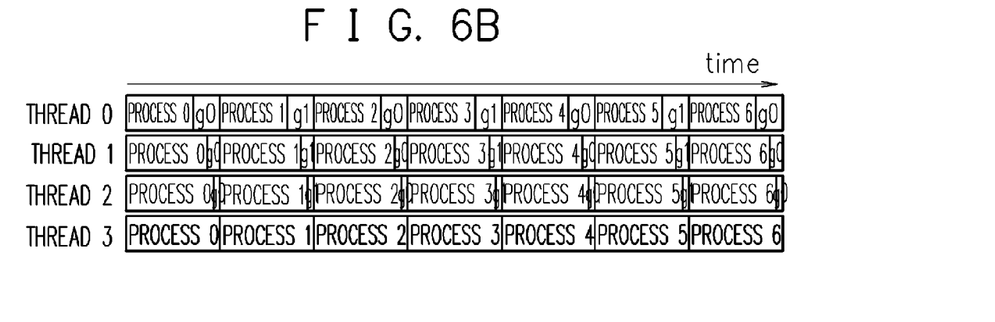
FIG. 6B is a view illustrating an operation example in which the thread progress control according to the present embodiment is applied.

As stated above, the core of the processor reads out the state of the gate by specifying every certain process in each thread executing the process in parallel, proceeds to the next process when the state of the specified gate is the opened state, and makes the execution of the next process wait until the state of the specified gate becomes the opened state when the state of the specified gate is not the opened state. The thread whose progress is fast thereby proceeds to the next process after waiting for the relatively long time until the gate becomes the opened state, and the thread whose progress is slow proceeds to the next process after waiting for the short time or without waiting until the gate becomes the opened state. It is thereby possible to shorten the progress difference between the thread whose progress is fast and the thread whose progress is slow. For example, when the process times are different in the thread0 (zero) to the thread4, and the progress difference among the threads expands as illustrated in FIG. 6A if the processes are simply executed, it is possible to suppress the expansion of the progress difference among threads as illustrated in FIG. 6B by applying the present embodiment. Accordingly, it is possible to suppress that the progress difference between the thread whose progress is fast and the thread whose progress is slow expands, and to improve execution performance of the program by reducing the number of occurrence times of the cache miss and the TLB miss. A constitution of the above-stated thread progress control mechanism is simple and it is possible to reduce the synchronization cost and to equip with a few hardware amount compared to a mechanism in which a thread which is in the active state is specified, and all of the specified threads are verified to reach the synchronization points.

Hereinafter, the transition of the state of the gate in the present embodiment is described in detail. In the following description, a case when two gates (gate0 and gate1) are prepared is described as an example. The control of the state of each gate is performed by the gate management unit 14 of the thread progress control unit 11, and the control of the counter corresponding to each gate is performed by the counter control unit 15 of the thread progress control unit 11. In the following description, a counter corresponding to the gate0 is called as a counter0 (zero), and a counter corresponding to the gate1 is called as a counter1.

Figure 7:
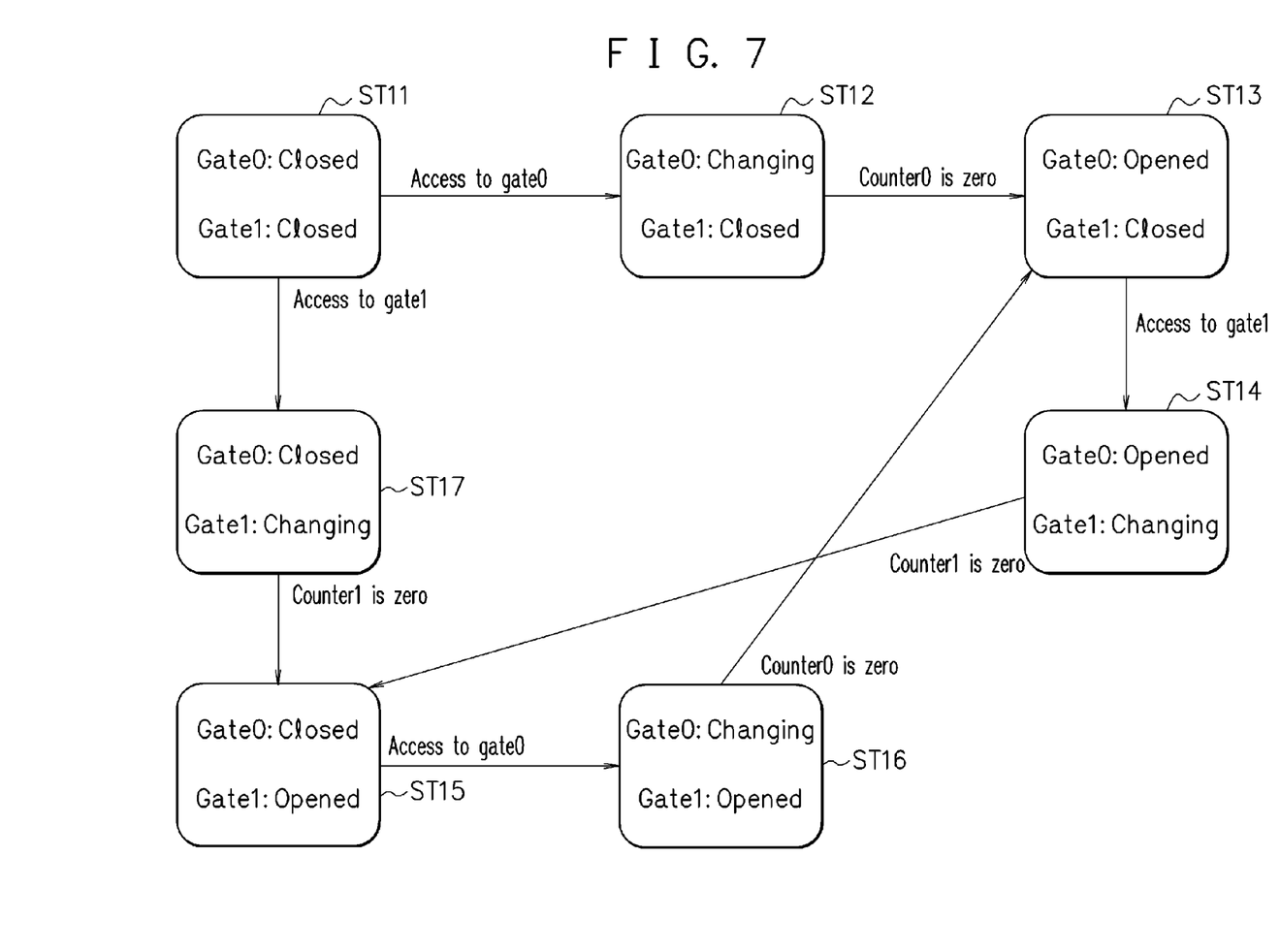
FIG. 7 is a view illustrating an example of the state transition of the gates according to the present embodiment.

FIG. 7 is a view illustrating an example of the state transition of the gate in the present embodiment. A state ST11 is an initial state, and all of the gates, namely, the gate0 and the gate1 are both the closed states.

In the state ST11, when there is an access from a certain thread for the gate0, the gate0 is made transit from the closed state to the changing state and the counter0 is initialized, then it becomes a state ST12 in which the gate0 is the changing state and the gate1 is the closed state. In the state ST12, the count down operation of the counter0 is performed. In the state ST12, a value of the counter0 becomes "0" (zero), namely, a certain period of time elapses from a time when it becomes the state ST12, then the gate0 transits from the changing state to the opened state, and it becomes a state ST13 in which the gate0 is the opened state and the gate1 is the closed state.

In the state ST13, when there is an access from a certain thread for the gate1, the gate1 is made transit from the closed state to the changing state and the counter1 is initialized, and it becomes a state ST14 in which the gate0 is the opened state and the gate1 is the changing state. In the state ST14, the count down operation of the counter1 is performed. In the state ST14, a value of the counter1 becomes "0" (zero), namely, a certain period of time elapses from a time when it becomes the state ST14, then the gate1 is made transit from the changing state to the opened state, and the gate0 as a next gate is made transit from the opened state to the closed state, and it becomes a state ST15 in which the gate0 is the closed state and the gate1 is the opened state.

In the state ST15, when there is an access from a certain thread for the gate0, the gate0 is made transit from the closed state to the changing state and the counter0 is initialized, then it becomes a state ST16 in which the gate0 is the changing state and the gate1 is the opened state. In the state ST16, the count down operation of the counter0 is performed. In the state ST16, the value of the counter0 becomes "0" (zero), namely, a certain period of time elapses from a time when it becomes the state ST16, then the gate0 is made transit from the changing state to the opened state, the gate1 as the next gate is made transit from the opened state to the closed state, and it becomes the state ST13 in which the gate0 is the opened state and the gate1 is the closed state.

Note that in the state ST11, when there is an access from a certain thread for the gate1, the gate1 is made transit from the closed state to the changing state and the counter1 is initialized, and it becomes a state ST17 in which the gate0 is the closed state and the gate1 is the changing state. In the state ST17, the count down operation of the counter1 is performed. In the state ST17, the value of the counter1 becomes "0" (zero), namely, a certain period of time elapses from a time when it becomes the state ST17, then the gate1 is made transit from the changing state to the opened state, and it becomes the state ST15 in which the gate0 is the closed state and the gate1 is the opened state. Note that in the example illustrated in FIG. 7, the state transition does not occur when a certain gate is in the changing state (states ST12, ST14, ST16, ST17) even if any gate is accessed.

Figure 8:
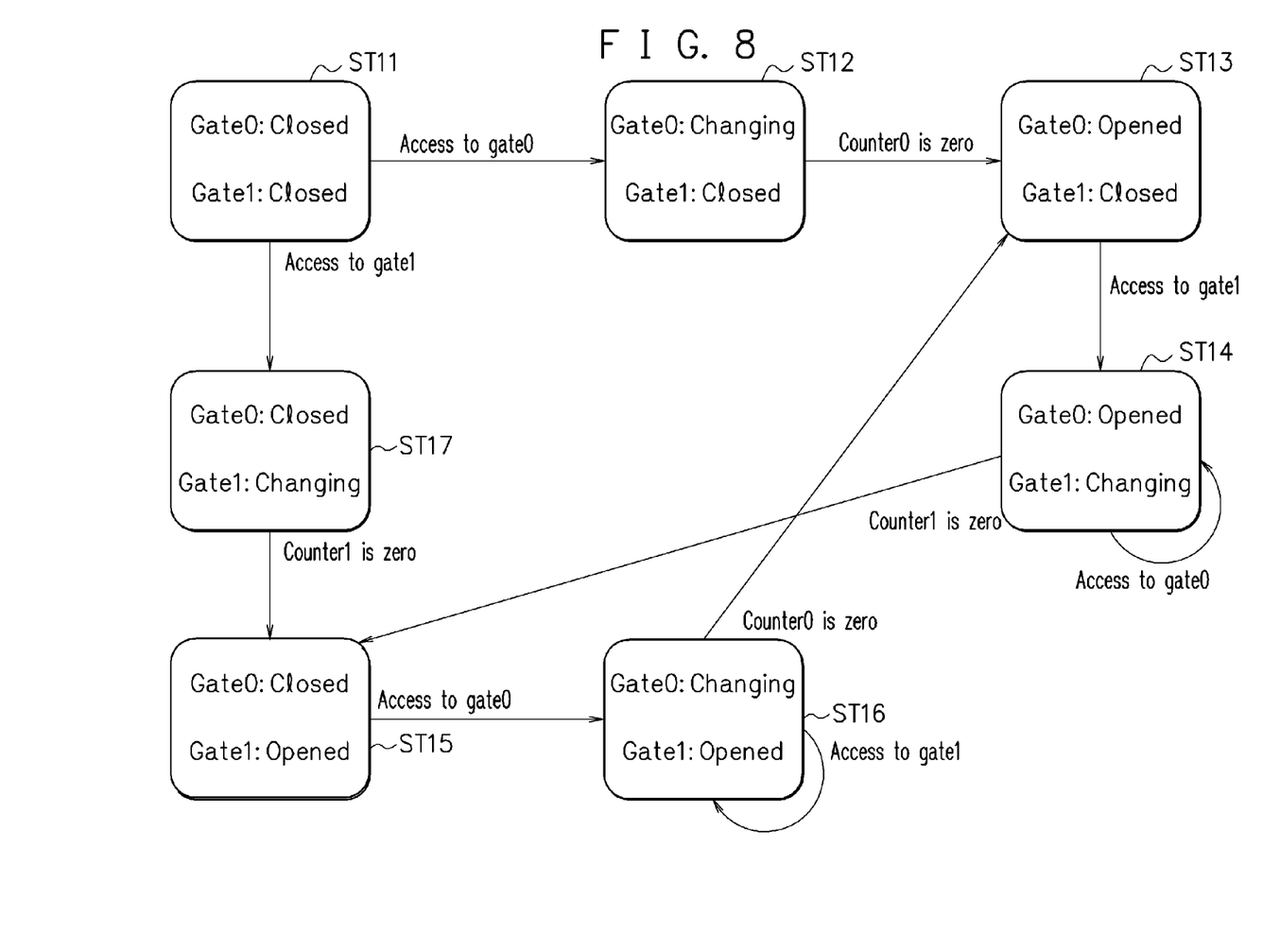
FIG. 8 is a view illustrating another example of the state transition of the gates according to the present embodiment.

FIG. 8 is a view illustrating another example of the state transition of the gate in the present embodiment. In the example illustrated in FIG. 8, behaviors are different from the example illustrated in FIG. 7 when there is an access from a certain thread for the gate0 in the state ST14 and there is an access from a certain thread for the gate1 in the state ST16. Redundant descriptions with the example illustrated in FIG. 7 are not given.

In the state ST14 in which the gate0 is the opened state and the gate1 is the changing state, when there is an access from a certain thread for the gate0 before the value of the counter1 becomes "0" (zero), the value of the counter1 is increased for a certain amount or initialized. A period until the gate1 is made into the opened state is extended as stated above, and thereby, the transition of the gate0 being a previous gate into the closed state is delayed, and a period when the gate0 is in the opened state is extended. It is thereby possible to make the number of delaying threads small and to shorten the progress difference between the threads.

In the state ST16 in which the gate0 is the changing state and the gate1 is the opened state, when there is an access from a certain thread for the gate1 before the value of the counter0 becomes "0" (zero), the value of the counter0 is increased for a certain amount or initialized. A period until the gate0 is made into the opened state is extended as stated above, and thereby, the transition of the gate1 being a previous gate into the closed state is delayed, and a period when the gate1 is the opened state is extended. It is thereby possible to make the number of delaying threads small and to shorten the progress difference between the threads.

Figure 9:
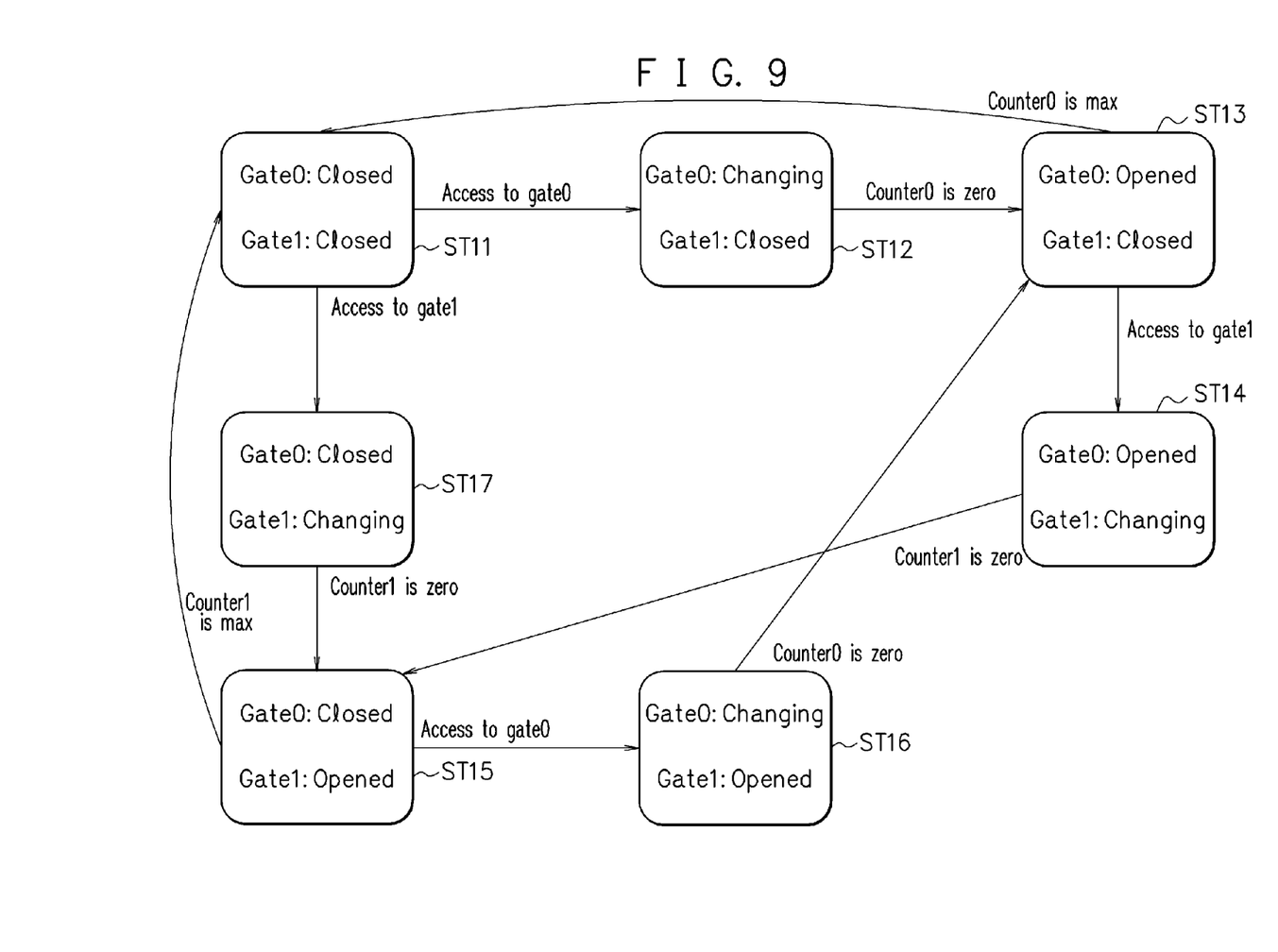
FIG. 9 is a view illustrating still another example of the state transition of the gates according to the present embodiment.

FIG. 9 is a view illustrating still another example of the state transition of the gate according to the present embodiment. The example illustrated in FIG. 9 is different from the example illustrated in FIG. 7 in behaviors from the time when it becomes the states ST13, ST15. Redundant descriptions with the example illustrated in FIG. 7 are not given.

In the example illustrated in FIG. 9, in the state ST13 in which the gate0 is the opened state and the gate1 is the closed state, the count up operation of the counter0 is performed. In the state ST13, the value of the counter0 reaches a certain value ("max" in the example illustrated in FIG. 9) before there is an access from a certain thread for the gate1, namely, a certain period of time elapses from a time when it becomes the state ST13, the gate0 is made transit from the opened state to the closed state, and it becomes the state ST11 in which both the gate0 and the gate1 are the closed states.

In the state ST15 in which the gate0 is the closed state and the gate1 is the opened state, the count up operation of the counter1 is performed. In the state ST15, the value of the counter1 reaches a certain value ("max" in the example illustrated in FIG. 9) before there is an access from a certain thread for the gate0, namely, a certain period of time elapses from a time when it becomes the state ST15, the gate1 is made transit from the opened state to the closed state, and it becomes the state ST11 in which both the gate0 and the gate1 are the closed states.

In an aspect of the present embodiment, it is possible to prevent an expansion of progress difference between threads by delaying execution of a next process of a thread whose progress is fast among threads each in an active state, and to improve an execution performance of programs of a processor by reducing the number of occurrence times of cache miss and TLB miss.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processor, comprising:
a progress control unit which holds information of plural gates disposed in a loop manner, wherein when the progress control unit sets a state of a first gate to a first state, the progress control unit sets a state of a second gate disposed subsequently relative to the first gate to a second state, when the progress control unit receives an earliest request of reading the state for the second gate, the progress unit sets the state of the second gate to a third state, and when a certain period of time elapses from setting the state of the second gate to the third state, the progress control unit sets the state of the second gate to the first state; and
an instruction execution unit which executes processes in plural threads, specifies one of the gates from among the plural gates to read out a state of a specified gate from the progress control unit by every certain process in each thread, executes a next process when the state of the specified gate is the first state, and makes the execution of the next process wait until the state of the specified gate becomes the first state when the state of the specified gate is not the first state.

2. The processor according to claim 1,
wherein the progress control unit includes a counter which starts a count operation from receiving the earliest request of reading the state for the second gate, and
sets the state of the second gate to the first state when a value of the counter becomes a certain value.

3. The processor according to claim 1,
wherein the progress control unit extends a period until the state of the second gate is set to the first state, when receiving a request of reading the state for the first gate before the certain period of time elapses from receiving the earliest request of reading the state for the second gate.

4. A control method of a processor including an instruction execution unit executing processes in plural threads, comprising:
holding information of plural gates disposed in a loop manner, setting a state of a second gate disposed subsequently relative to a first gate to a second state when a state of the first gate is set to a first state, setting the state of the second gate to a third state when receiving an earliest request of reading the state for the second gate, and setting the state of the second gate to the first state when a certain period of time elapses from setting the state of the second gate to the third state, by a progress control unit of the processor; and
specifying one of the gates from among the plural gates to read out a state of a specified gate from the progress control unit by every certain process in each thread, executing a next process when the state of the specified gate is the first state, and making the execution of the next process wait until the state of the specified gate becomes the first state when the state of the specified gate is not the first state, by the instruction execution unit.

5. The processor according to claim 1,
wherein plural instruction execution units, each of which is the instruction execution unit, are included in the processor, and
wherein the progress control unit is disposed to be accessible from all of the plural instruction execution units.

6. The processor according to claim 1, wherein, in each thread, the gate to be specified is switched by every certain process so that the gates are circulated in sequence.

7. The processor according to claim 1, wherein the instruction execution unit delays the progress of the thread by making the execution of the next process wait until the state of the specified gate becomes the first state when the state of the specified gate is not the first state.

8. The control method according to claim 4, wherein, in each thread, the gate to be specified is switched by every certain process so that the gates are circulated in sequence.

9. The control method according to claim 4, further comprising: delaying the progress of the thread by making the execution of the next process wait until the state of the specified gate becomes the first state when the state of the specified gate is not the first state.

* * * * *